Jan. 3, 1967  J. F. SEBALD  3,295,605

SERVICE WATER PURIFICATION SYSTEM

Filed Nov. 6, 1964  4 Sheets-Sheet 1

JOSEPH F. SEBALD
*INVENTOR.*

BY Daniel H. Bobis
Atty

Jan. 3, 1967  J. F. SEBALD  3,295,605
SERVICE WATER PURIFICATION SYSTEM

Filed Nov. 6, 1964  4 Sheets-Sheet 2

JOSEPH F. SEBALD
INVENTOR.

BY Daniel H. Bobis
Atty

Jan. 3, 1967  J. F. SEBALD  3,295,605
SERVICE WATER PURIFICATION SYSTEM
Filed Nov. 6, 1964  4 Sheets-Sheet 3

JOSEPH F. SEBALD
INVENTOR.

BY Daniel H. Bobis
Atty

JOSEPH F. SEBALD
INVENTOR.

United States Patent Office 3,295,605
Patented Jan. 3, 1967

3,295,605
SERVICE WATER PURIFICATION SYSTEM
Joseph F. Sebald, Bloomfield, N.J., assignor to Worthington Corporation, Harrison, N.J., a corporation of Delaware
Filed Nov. 6, 1964, Ser. No. 409,470
15 Claims. (Cl. 165—66)

This invention relates generally to a service water purification system. More particularly, the invention relates to a service water purification system for providing a potable water supply from a nonpotable, or suspected nonpotable source.

Today there are few sources of natural surface water, few cisterns and few ponds which are wholly free of contamination. Even deep wells are suspect, especially when they are used as a source of potable water in areas where sewage disposal is accomplished with cesspools and septic tanks. Accordingly, in order to assure the potability of the water, proper disinfection is a necessity.

Though chlorination is an acceptable method of disinfection, it presents problems related to the control and servicing of the associated equipment. If a high chlorine residual is needed to disinfect the water supply, the treated water may become unpalatable for purposes of drinking or cooking.

The use of heat has also been used to kill harmful bacterial pathogens and other organisms such as worms, viruses, amebic cysts, molds and sphores. However, the prior art purification systems which used heat required elaborate equipment and controls therefor.

An object of the present invention is to provide an improved service water purification system which overcomes the prior art difficulties; which is adapted to deliver hot or cold purified water for service use or storage; which uses counterflow heat exchange means to preheat the untreated water, while cooling the treated water; which provides a purification system of simple design that is both reliable and economic; which may have automatic temperature or pressure responsive safety features to insure that the predetermined temperature conditions of the system are maintained.

Another object of this invention is to provide an improved purification system which uses thermo-siphon circulation means to recirculate the hot treated water to maintain a quantity of treated water at the desired temperature and "ready" for immediate discharge at all times, especially during periods of nonuse; which is designed to accomplish the necessary retention time-temperature level relationship for the destruction of the bacteria and microorganisms which may be present in the untreated water; which will automatically shut down should there be a system failure or in the event that the process temperature falls below a predetermined safe level.

The term "purification" has been used herein to include both sterilization and pasteurization. The source and extent of contamination of the untreated water will be the determining factor in setting the retention time needed for purification of the untreated water and the corresponding temperature level which must be reached in order to insure that the system has rendered the water potable. Depending on the condition of the water, pasteurization can be accomplished within the temperature range of between 150° F. to 180° F. at suitable design water retention periods. Sterilization, on the other hand, will usually require a temperature within the range of 212° F. to 290° F. at suitable design water retention periods. Regardless of whether the system is referred to as accomplishing purification, pasteurization, or sterilization, it is understood that only minor adjustments need be made so as to change the required time retention or temperature level settings to enable the purification process to be one of either pasteurization or sterilization. Further the needed time retention of the water will usually be taken care of as the untreated water passes through the system, is heated and becomes purified.

Other objects and advantages will be apparent from the following description of several embodiments of the invention and the novel features will be particularly pointed out hereinafter in the claims.

Figure 1:
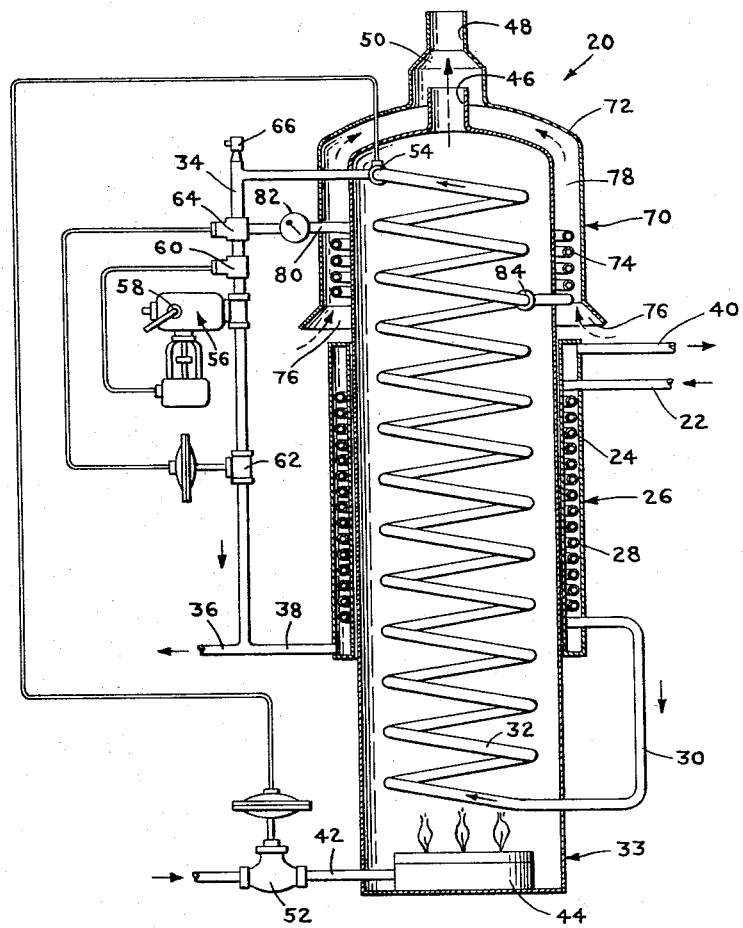
FIGURE 1 is a cross-sectional view of an improved service water purification system.
Figure 2:
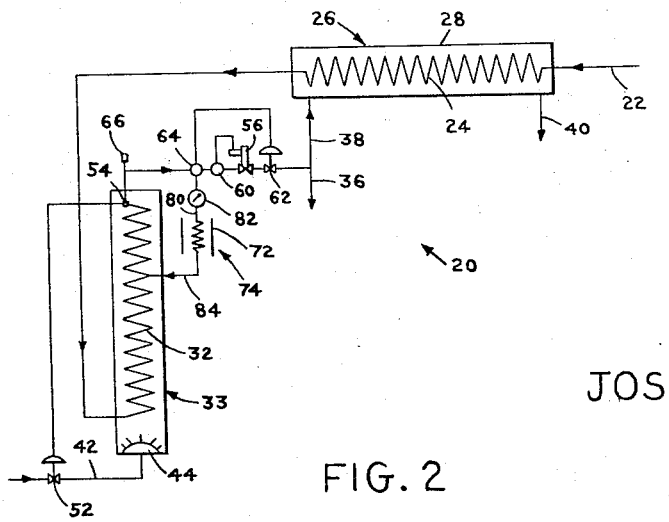
FIGURE 2 is a schematic flow diagram illustrating the apparatus of the improved purification system of FIGURE 1.

In the embodiment of the invention shown in FIGURES 1 and 2 the novel service water purification system 20 is adapted especially for low temperature purification (usually pastuerization) which enables the hot, treated water to be withdrawn directly from the system for service use or storage. As in the other form of the present invention, the untreated water will be delivered to the improved purification system 20 at a sufficiently high pressure so as to prevent the water from boiling at the maximum expected temperature during treatment in said system. This has the dual advantage of shortening the required retention time period for purification and also conserving the quantity of B.t.u.'s required by purification system 20 as no latent heat is required or used.

Untreated water from a suitable pressure source (not shown) is delivered in line 22 to heat exchanger coil 24 of heat exchanger 26 where it is preheated by passing in indirect heat exchange relationship with hot purified water which was introduced into shell 28 of heat exchanger 26 to pass in counterflow indirect heat exchange relationship therewith. Line 30 will deliver the preheated untreated water from heat exchanger coil 24 to the heater coil 32 of heater 33 in which it will flow from the lower end thereof and be heated so that prior to its discharge from the upper end of coil 32 it will have attained a temperature of substantially 150° F. or more and been retained therein sufficient time to assure purification of the water in question. Line 34 will deliver the hot, purified water to either discharge line 36 or to counterflow line 38. From line 36 the hot, purified water will be delivered directly for service use or storage. Line 38 will deliver the hot, purified water into shell 28 of heat exchanger 26 wherein it will pass in counterflow indirect heat exchange relationship with the untreated water in coil 24 and be cooled prior to its being discharged from shell 28 into line 40. From line 40 the now cold purified water will be delivered for service use or storage.

Heater 33 may be any conventional type heater using a suitable source of heat, either fuel, gas or electricity, with the fuel type being shown in the drawings merely for convenience, as the control principles would be the same regardless of which media of heat source was used. Fuel is introduced through line 42 to burner 44. In burner 44 the fuel is ignited and the heat energy is given off and passes upwardly over heater coil 32 prior to being discharged through opening 46 which communicates with flue 48. Adjacent opening 46 a chamber means 50 is formed at the lower end of flue 48 for purposes more fully described hereinafter. A temperature actuated fuel control valve 52 is disposed in line 42 to regulate the flow of fuel delivered to burner 44 responsive to the temperature indicated by signal means 54 located at the upper discharge end of heater coil 32.

In order to completely insure the safe operation of service water purification system 20 at the designed temperatures an automatic cutoff valve 56 having manual reset means 58 and operated responsive to the temperature signal received by temperature sensitive bulb 60, is disposed in line 34. On the temperature of the purified water in line 34 decreasing below a predetermined level, cutoff valve 56 will automatically operate to stop the flow in line 34. Once it has operated and shut off flow, it will remain in this closed position until it has been manually reset; this feature will require a preliminary safety check of the system before allowing operation thereof to be resumed.

In addition to and cooperating with the automatic cut off feature, a temperature control regulator valve 62 is also disposed in line 34. Regulator valve 62 will operate responses the temperature signal received by bulb 64 connected to line 34 upstream of bulb 60, to regulate the flow passing through line 34 in such a way as to usually maintain the temperature therein at a level substantially higher than that which will cause cutoff valve 56 to operate.

To provide maximum safety, regulator valve 62 and fuel control valve 52 will each operate cooperatively to regulate the quantity and temperature, respectively, of the purified water being discharged from line 34. In the event that the service water demand on service water purification system 20 exceeds the heat transfer capacity of the system, the regulator valve 62 will reduce the flow rate to match the rate of heat output of burner 44 of heater 33 so as to insure the maintenance of the preset proper purification temperature. Should the temperature fall in the vicinity of the preset safe value, regulator valve 62 will usually act to stop the flow in line 34, but in any event, on a malfunction of service water purification system 20, cutoff valve 56 will always operate to stop the flow from line 34 as then the temperature would have fallen below the preset safe level. Cutoff valve 56 provides the further aforementioned safety feature of requiring a manual reset before service water purification system 20 can be made operable, as operation of cutoff valve 56 may indicate that maintenance of system 20 is required.

A relief valve 66 may conveniently be connected at the high point of line 34 to pass off any trapped gases and prevent the dangerous build up of pressure in system 20.

A thermo-siphon circulator means 70 is provided for service water purification system 20 in order to maintain a predetermined quantity of hot, purified water at a substantially preset delivery temperature. In order to accomplish this, heater 33 has a hood 72 formed at the upper end thereof which covers cooling coil 74 and extends to join into flue 48. The lower end of hood 72 has an annular opening 76 which permits ambient air, indicated by the dashed line arrow, to enter passage 78 into which it is drawn by the hot air in heater 33 leaving opening 46 as it enters chamber 50 of flue 48 wherein it mixes with the hot air leaving opening 46. This mixture will exit from flue 48. The ambient air is at a substantially lower temperature than either the air leaving heater 33 or the hot purified water being discharged from heater coil 32. Line 34 will continuously deliver a portion of the hot purified water therein for recirculation, starting in line 80 in which it passes through a one way valve or check valve 82 before entering cooling coil 74. The ambient air flowing through passage 78 will cause a slight degree of cooling of the hot purified water in cooling coil 74, sufficient to maintain the flow thereof by the thermo-circulation of the said water in the thermo-circulator means 70 while maintaining consistant safe levels of temperature thereof. The hot, purified water in cooling coil 74 will be at slightly lower temperature level when it is circulated to line 84 which will redeliver the hot, purified water back to heater coil 32 at a point intermediate the ends thereof, for recirculation therein. Check valve 82 prevents the short circuiting of partially heated water and prevents such water from entering line 34. Accordingly, the thermo-siphon circulating means 70 will continuously maintain a substantial amount of the purified water at a predetermined temperature level, even during long periods of nonuse of the system, so that a sudden demand for water may be supplied immediately and continuously regardless of service use.

As was described previously, the flow of purified water may be used for hot service use directly from the heater coil 32 or flow may be maintained in heat transfer relationship in heat exchanger 26 from which the purified water will be discharged in line 40 for cold water service use. The temperature of the hot or cold purified water discharged from line 36 and 40 respectively, may be substantially within the range of temperatures shown in FIGURES 7 and 8 (to be described hereinafter). However, in certain cases the discharge temperature of the hot or cold purified water may be increased or decreased as desired with but slight modification of the existing apparatus.

Figure 3:
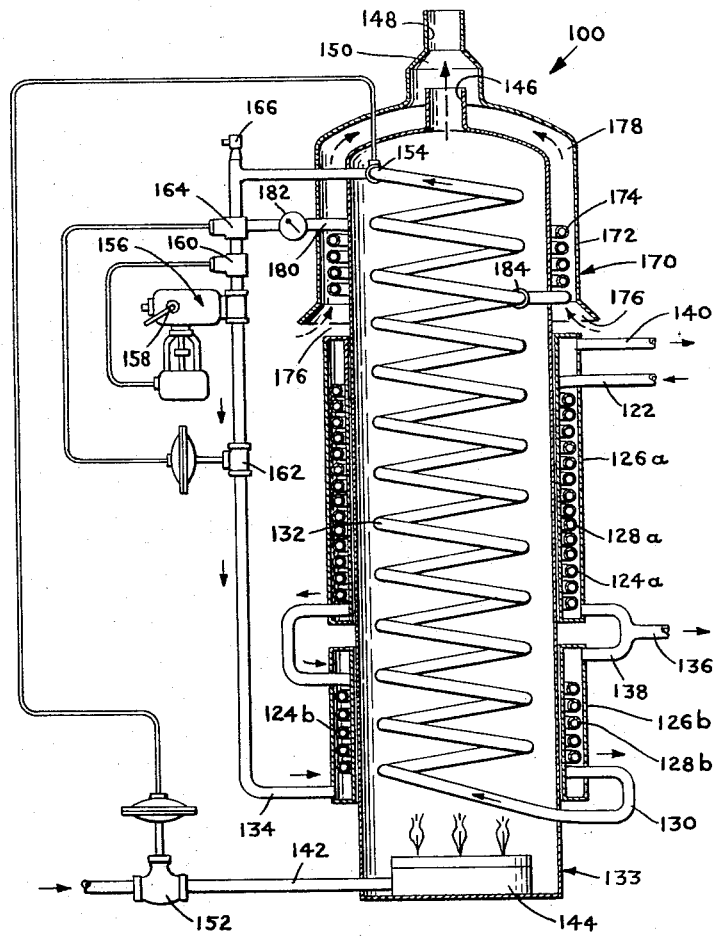
FIGURE 3 is another form of the improved service water purification system.
Figure 4:
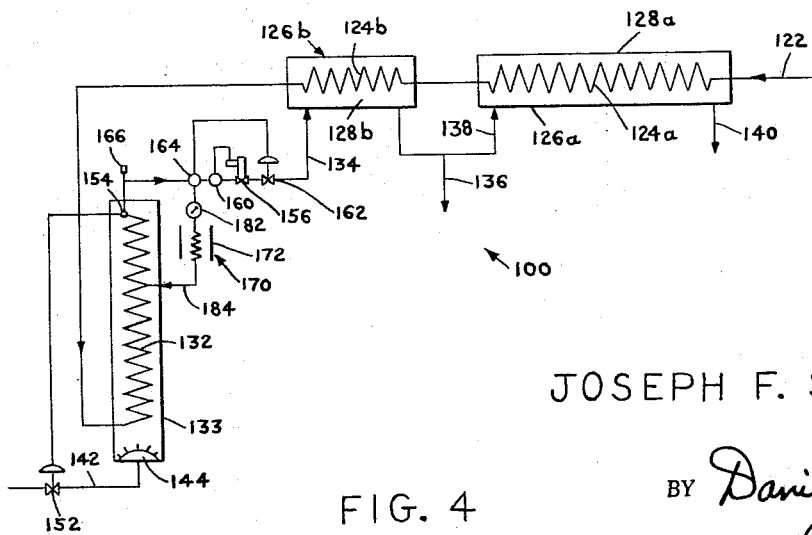
FIGURE 4 is a schematic flow diagram of the apparatus of the improved purification system of FIGURE 3.

In the embodiment of the invention illustrated in FIGURES 3 and 4 another form of the novel service water purification system, designated generally 100 is shown.

Purification system 100 is designed to generally operate at purification temperatures within the range of 170° F.–230° F., and to have suitable retention time periods dependent upon the degree of disenfection necessary to render the water potable.

Untreated water from a suitable pressure source (not shown) is delivered in line 122 to pass successively to heat exchanger coils 124a and 124b of heat exchangers 126a and 126b respectively where it is preheated by passing in indirect heat exchange relationship with hot purified water as described hereinbefore under FIGURES 1 and 2. Line 130 will deliver the preheated untreated water from heat exchanger coil 124b to the heater coil 132 of heater 133 in which it will flow from the lower end thereof and be heated so that prior to its discharge from the upper end of coil 132 it will have attained a preset temperature substantially within the range of 170° F.–230° F.

Since the discharge temperature from heater coil 132 is in excess of normal hot water service use the hot purified water from line 134 will enter shell 128b of secondary heat exchanger 126b to pass in indirect heat exchange relationship with the untreated water in secondary heat exchanger 126b prior to its being discharged in line 136 for hot service water use or storage. Line 138 interconnects the shell 128b of secondary heat exchanger 126b to shell 128a of primary heat exchanger 126a, in addition to having discharge line 136 extending therefrom. The remainder of the hot, purified water at service use temperature, not discharged in line 136, will pass through line 138 into shell 128a of primary heat exchanger 126a for additional counterflow indirect heat exchange with the incoming untreated water and be cooled to the desired cold water service use temperature, prior to being discharged in line 140 for cold water service use for storage. It is noted that the use of the counterflow indirect heat exchange of the hot purified water within the primary heat exchanger 126a and secondary heat exchanger 126b to the desired hot and cold water discharge temperatures eliminates the need for costly additional temperature controls.

As was described hereinbefore with reference to improved system 20, any conventional type heater, which uses a suitable source of heat, either fuel, gas or electricity, may be used. Accordingly, for convenience, a heater, designated generally 133, of the fuel burning type may be used. Once again, fuel is introduced through line 142 to burner 144. In burner 144 the fuel is ignited and the heat energy is given off and passes upwardly over heater coil 132 prior to being discharged through opening 146 which communicates with flue 148 by way of chamber means 150. A temperature actuated fuel control valve 152 is disposed in line 142 to regulate the flow of fuel delivered to burner 144 responses the temperature indicated by signal means 154 at the upper discharge end of heater coil 132.

Similar means are provided to insure the safe operation of service water purification system 100 at the designed temperatures as was utilized in improved system 20, described hereinbefore. Accordingly, an automatic cutoff valve 156 having manual reset means 158 and operated responsive to the temperature signal received by temperature sensitive bulb 160 is disposed in line 134. On the temperature of the purified water in line 134 falling below a predetermined level, cutoff valve 156 will automatically operate to stop the flow in line 134. Once valve 156 has operated and shut off the flow, it will remain in a closed position until being manually reset. Thus, on malfunction of improved system 100, a preliminary safety check of system 100 will be indicated before operation thereof can be resumed by the resetting of valve 156.

Temperature control regulator valve 162 is also operatively disposed in line 134. Regulator valve 162 will operate responses the temperature signal received by bulb 164 connected to line 134 to regulate the flow in line 134 so as to maintain the temperature therein at a level substantially higher than that which will cause cutoff valve 156 to operate. Also, regulator valve 162 and fuel control valve 152 will each operate cooperatively to regulate the quantity and temperature, respectively, of the purified water passing from line 134 so that regulator valve 162 will reduce the flow rate to match the rate of heat output of burner 144 of heater 133 so as to insure the maintenance of the preset proper purification temperature.

The desired operative temperature of the improved service water purification system 100 may be selectively regulated by suitable adjustments of the temperature control regulator valve 162 and fuel control valve 152 so as to effect a corresponding temperature adjustment of the operative temperature of the heater coil 162 and input of heat energy from heater 133 both of which serve to set the operative temperature within the range previously indicated.

A relief valve 166 may conveniently be connected at the high point of line 134 to pass off any trapped gases and prevent the dangerous build up of pressure in improved system 100.

A thermo-siphon circulator means 170 is again provided in order to maintain a predetermined quantity of hot, purified water at a substantially pre-set delivery temperature. In order to accomplish this heater 133 has a hood 172 formed at the upper end thereof which covers cooling coil 174 and extends to join into flue 148. The lower end of hood 172 has an annular opening 176 which permits ambient air to enter passage 178 into which it is drawn by the discharge of hot air in heater 133 through opening 146 into chamber 150 wherein it mixes with the said hot air and enters flue 148 therewith. The ambient air is at a substantially lower temperature than both the air leaving heater 133 and the hot purified water being discharged from heater coil 132. A portion of the hot purified water in line 134 will be continuously recirculated to line 180 in which it passes through one way valve or check valve 182 before entering cooling coil 174. The ambient air flowing through passage 178 will cause a slight degree of cooling of the hot purified water in cooling coil 174, sufficient to maintain the flow thereof by the thermo-circulation of the said water in the thermo-circulator means 170 while maintaining consistent safe levels of temperature thereof. The hot, purified water in cooling coil 174 will be at slightly lower temperature level when it is circulated to line 184 which will redeliver the hot, purified water back to heater coil 132 for reheating thereof and recirculation therein. Check valve 182 prevents the short circuiting of partially heated water and prevents such water from entering line 134. Thus, even after long periods of non-use improved system 100 will have available for delivery a substantial amount of purified water at a predetermined temperature level, so that a sudden demand for water may be supplied immediately and continuously regardless of service use.

Figure 5:
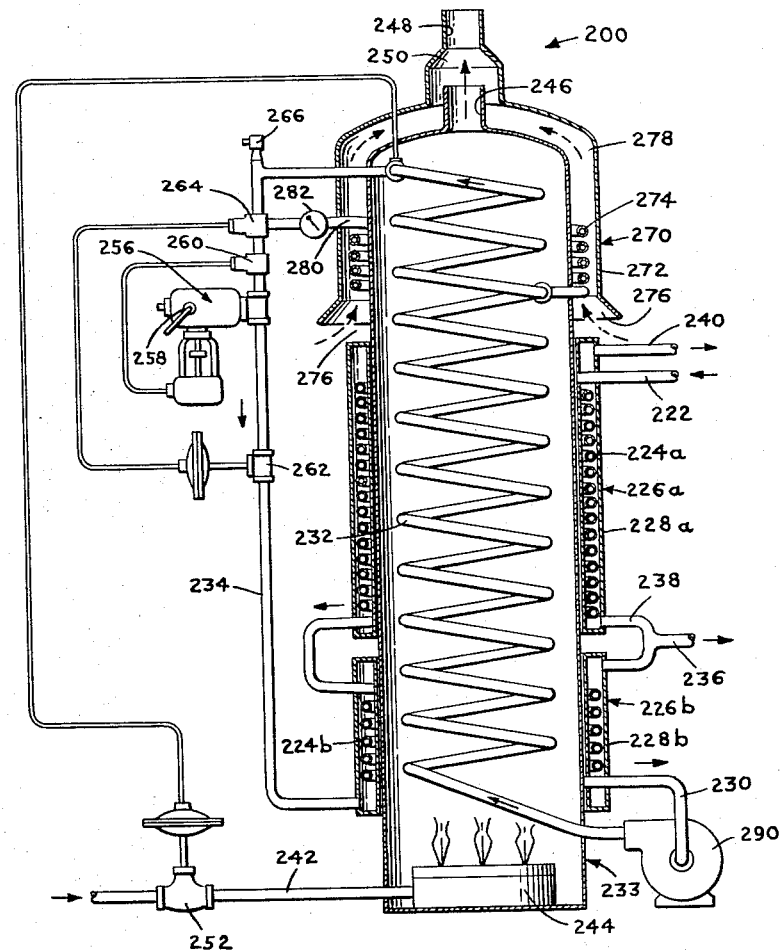
FIGURE 5 is a cross-sectional view of yet another form of the improved service water purification system.
Figure 6:
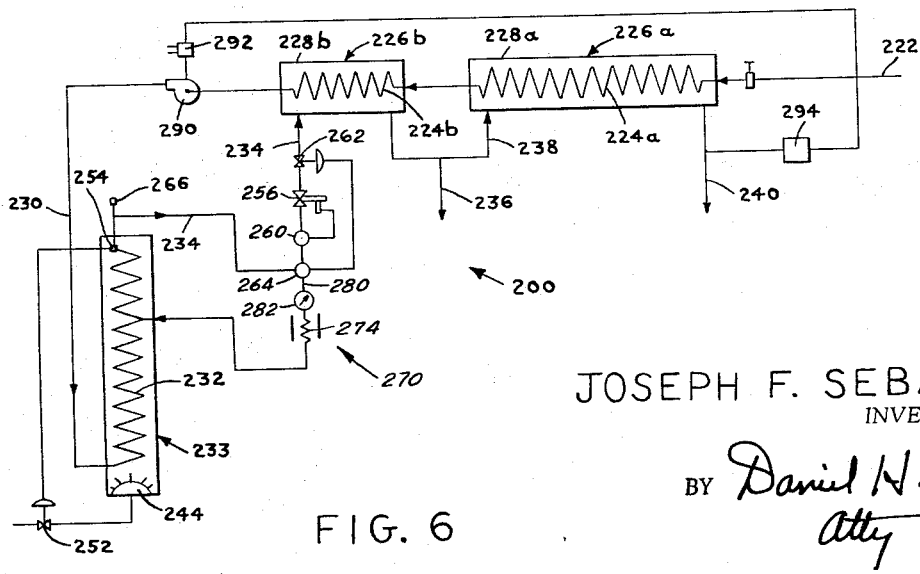
FIGURE 6 is a schematic flow diagram of the apparatus of the improved purification system of FIGURE 5.

In the embodiment of the invention illustrated in FIGURES 5 and 6 another form of the service water purification system, designated generally 200 is depicted.

Improved system 200 is designed to generally operate at purification temperatures within the range of 250° F.–300° F. and to have suitable retention time periods, dependent upon the degree of disinfection necessary to render the water potable.

Untreated water from a suitable pressure source (not shown) is delivered in line 222 to pass successively to heat exchanger coils 224a and 224b of heat exchangers 226a and 226b, respectively where it is preheated by passing in indirect heat exchange relationship with hot purified water as described hereinbefore. Line 230 delivers the preheated untreated water from heat exchanger coils 224b to the heater coil 232 of heater 233 in which it will flow from the lower end thereof and be heated so that prior to its discharge from the upper end of coil 232 it will have attained the desired preset temperature substantially within the above noted range.

Since the discharge temperature from heater coil 232 is considerably in excess of normal hot water service use, the hot purified water from line 234 will enter shell 228b of secondary heat exchanger 226b to pass in indirect heat exchange relationship with the untreated water in secondary heat exchanger 226b prior to being discharged in line 236 for hot service water use or storage. Line 238 interconnects the shell 228b of secondary heat exchanger 226b to shell 228a of primary heat exchanger 226a, in addition to having discharge line 236 extending therefrom. The remainder of the hot, purified water at service use temperature not discharged in line 236 will pass through line 238 into shell 228a of primary heat exchanger 226a for additional counterflow indirect heat exchange with the incoming untreated water and be cooled to the desired cold water service use temperature, prior to being discharged in line 240 for cold water service use or storage. It is noted that the use of the counterflow indirect heat exchange of the hot purified water within the primary heat exchanger 226a and a secondary heat exchanger 226 b to the desired hot and cold water discharge temperatures eliminates the need for costly additional temperature controls.

In the event that the improved service water purification system 200 is not utilized with pressurized hot and cold service water, storage water tanks (not shown) and high flow rates are desired, a fail safe and pressurizing pump 290 may be operatively disposed in line 230 to overcome the effect of pressure losses at such high flow rates. Pump 290 is arranged to come into service at a predetermined differential pressure between inlet line 222 of the untreated water and discharge line 240 of the cold purified water, and to be shut off at a preset minimum pressure differential. In actual operation, the motor (not shown) of pump 290 will be activated responsive motor starter 292, which in turn is controlled by differential pressure switch 294. Switch 294 is connected to measure the differential pressure existing between lines 222 and 240.

During periods when the pressure differential is sufficiently low so that pump 290 is non-operational, the improved system 200 will function as if pump 290 was not in the system.

Heater 233 is again of any conventional design as explained hereafter, with the fuel type being shown in the drawing merely for convenience. Fuel is introduced through line 242 to burner 244. In burner 244 the fuel is ignited and the heat energy is given off and passes upwardly over heater coil 232 prior to being discharged through opening 246. Opening 246 communicates with flue 248 by way of a temperature actuated fuel control valve 252 which is disposed in line 242 to regulate the flow of fuel delivered to burner 244 responses the temperature indicated by signal means 254 at the upper discharge end of heater coil 232.

In order to completely insure the safe operation of service water purification system 200 at the designed temperature, an automatic cutoff valve 256 which has manual reset means and which is operated responsive to the temperature signal received by temperature sensitive bulb 260, is disposed in line 234. As was described under the previous systems, on the temperature of the purified water in line 234 falling below predetermined level cutoff valve 256 will automatically operate to stop the flow in line 234.

A relief valve 266 may conveniently be connected at the high point of line 234 to pass off any trapped gases and prevent the dangerous build up of pressure in system 200.

A thermo-siphon circulator means 270 is also provided for service water purification system 200 in order to maintain a predetermined quantity of hot, purified water at a substantially preset delivery temperature. Thermo-siphon circulator means 270 has substantially identical components and will operate substantially identically as the circulator means 70 and 170 described hereinbefore and will produce the same novel result. However, for the sake of clarity the components of circulator means 270 have been given reference characters in the two hundred (200) series so as to avoid any possible confusion. In other words, in circulator means 170 the coiling coil was designated generally as 174 and therefore, in circulator means 270 the coiling coil will have the reference character designation 274. Since the operation and results are identical as that described hereinbefore they need not be repeated.

Figure 7:
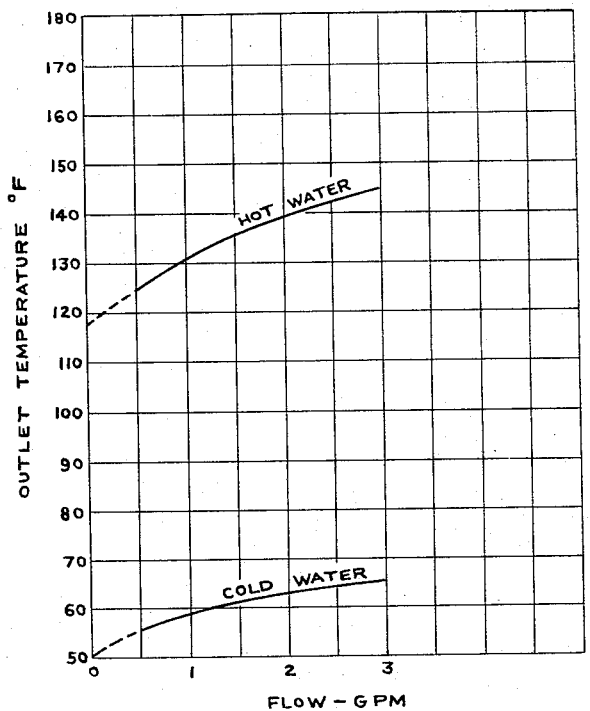
FIGURE 7 is a graph of the outlet temperature vs. flow during either hot or cold water flow, but not both.
Figure 8:
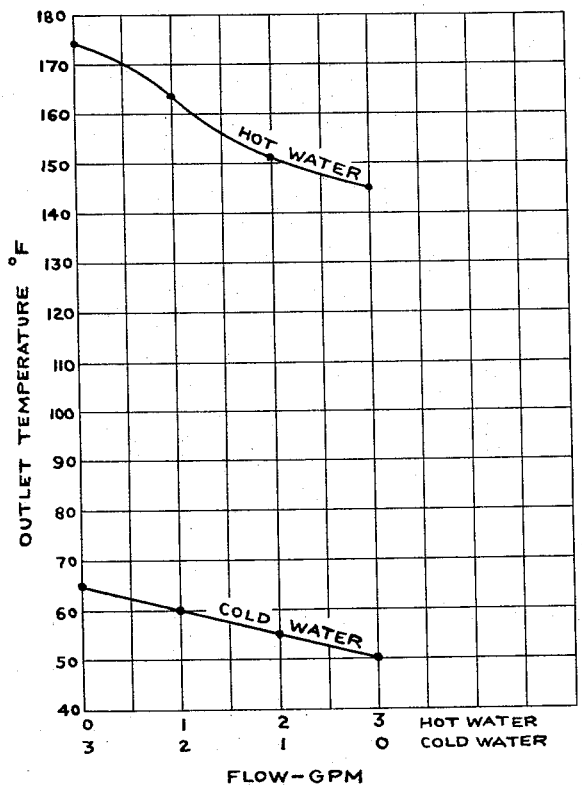
FIGURE 8 is a graph of outlet temperature vs. flow during simultaneous flow of the hot and cold water in a cumulative amount which totals 3 g.p.m., the selected illustrative design flow rate.

A typical example of the thermal characteristics of the improved service water purification system in the present invention are illustrated in FIGURES 7 and 8. They are representative of a design adapted for use with untreated water from a well source of substantially 50° F., purification within the system being accomplished at 180° F., and having a maximum flow rate of 3 g.p.m.

FIGURE 7 shows the outlet temperature of either the hot purified water or the cold purified water, at temperature levels during non-simultaneous discharge at flow rate of from 0.5 to 3.0 g.p.m.

At the maximum design flow rate, the cold purified water reaches its highest design discharge temperature of 65° F., while at flow rate of less than 0.5 g.p.m., indicated by the projected dashed line extension of the cold purified water temperature vs. flow curve, the discharge temperature of the cold purified water tends to approach the inlet temperature of the untreated water from the well source. This characteristic is not only acceptable, it is desirable, since when drawing small flows, usually for drinking purposes, a minimum temperature results. When drawing the cold purified water at higher rates, usually for washing, cooking and the like, the higher temperature range of cold water is obtained.

The temperature characteristics for the hot purified water are also uniquely desirable. At flow rate of less than 0.5 g.p.m., a condition which is frequently used for washing and rinsing one's hands, the discharge temperature shown as projected dashed line extension of the hot purified water temperature vs. flow curve would tend to fall slightly below 125° F., which temperature is close to the maximum temperature most people can comfortably withstand. As the flow rate of the hot purified water increases, there will be a corresponding increase in the discharge temperature thereof, to a maximum of 145° F. This characteristic is quite favorable because higher temperatures are related to higher demand, such as for cooking, cleaning and automatic machines for washing dishes or clothes.

FIGURE 8 illustrates the performance characteristics of a given improved service water purification system when it is operated at the maximum indicated design flow rate of 3 g.p.m., with the total flow made up of varying proportions of the hot purified water and the cold purified water. The temperature characteristics for the hot purified water reach a maximum temperature level of substantially 175° F., as the flow rate of the cold purified water approaches 3 g.p.m. while that of the hot purified water approaches 0.0 g.p.m. and will descend, as indicated to a minimum discharge temperature of 145° F., as the flow rate of the cold purified water approaches 0.0 g.p.m with a corresponding rise in the flow rate of the purified water which will approach 3.0 g.p.m. The discharge temperature of the cold purified water will vary from 50° F., as the flow rate of the cold purified water approaches 0.0 g.p.m., with the corresponding flow rate of the hot purified water approaching 3.0 g.p.m.

The highest discharge temperature of the hot purified water will be obtained as the cold purified water approaches a flow rate of 3.0 g.p.m., with the corresponding hot purified water having a flow rate approaching 0.0 g.p.m.

The discharge temperature ranges for the hot purified water and the cold purified water as illustrated in FIGURES 7 and 8 are within the generally acceptable limits of systems of this type.

If the improved service water purification system were used in conjunction with hot and cold water storage tanks, the refill flow rate can be set in relation to the thermal design characteristics of the system to provide water at a desired temperature which will also be substantially constant.

In order to facilitate assembly and disassembly of the improved system 20, 100 and 200, the heat exchangers 26, 126a, 126b, 226a and 226b, and the thermo-siphon circulators 70, 170 and 270 have all been shown of annular design which enables them to be disposed about the respective heaters 33, 133 and 233 and operatively associated therewith with a minimum of effort. Of course, in some cases it may be desirable to utilize different structural shapes or even assemblies spaced apart from each other but it will be understood that such changes are within the scope of the present invention.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. A service water purification system for purifying water comprising:
 (a) a heater having a coil therein;
 (b) the coil having an inlet and an outlet to pass water therethrough;
 (c) a source of heat for the heater;
 (d) a heat exchanger having a first inlet therein, the inlet connected to the outlet of the heater coil to receive hot purified water from the heater coil;
 (e) a sceond inlet in the heat exchanger to receive unpurified water, the unpurified water to pass in indirect heating exchange relationship with the hot purified water therein;

(f) a first outlet in the heat exchanger connected to the inlet of the heater coil to deliver pre-heated unpurified water to the heater coil;
(g) a second outlet in the heat exchanger to deliver cooled, purified water for service use;
(h) at least one additional outlet in the heat exchanger to deliver purified water, each of the outlets positioned to determine the extent of indirect heat transfer between the water from the heater coil and the untreated water, to deliver service water at a substantially pre-determined temperature;
(i) heat control means to regulate the input of heat energy from the heat source in accordance with the temperature of the water in the heater coil; and
(j) a temperature controlled valve operatively associated with the heater coil to regulate the flow of water from the heater coil in accordance with the temperature thereof, and in coaction with the heat control means, to reduce the flow rate of the water from the heater coil to maintain the lowest temperature required for water purification when the demand of the system exceeds the system heat transfer capacity.

2. The combination claimed in claim 1 including a temperature controlled cut-off valve, disposed intermediate the heater coil outlet and the heat exchanger inlet, operatively responsive to the temperature of the heater coil to stop the flow of water from the heater coil when the temperature thereof drops below a predetermined value.

3. The combination claimed in claim 1 wherein the heat exchanger is formed in an annular shape and disposed about the heater whereby the heat exchanger may be readily assembled and disassembled.

4. A service water purification system for purifying water comprising:
(a) a heater having a coil therein;
(b) the coil having an inlet and an outlet for the passage of water therethrough;
(c) means to heat the coil to purify the water passing therethrough;
(d) a thermo-siphonic circulation means connected in flow relationship with the heater coil at a point intermediate the inlet and the outlet thereof to recirculate a portion of the heated water back to the heater coil by means of thermal circulation whereby a quantity of the hot purified water is maintained at a preset temperature; and
(e) a service outlet line connected to the outlet of the heater coil to deliver hot purified water for service use.

5. The combination claimed in claim 4 wherein the thermo-syphonic water circulation means includes:
(a) a cooling coil having an inlet and an outlet therein;
(b) the inlet of the cooling coil connected to the outlet of the heater coil; and
(c) the outlet of the cooling coil connected to the heater coil at a point intermediate the inlet and outlet thereof, at which point only hot purified water flows during normal operation of the system.

6. The combination claimed in claim 5 including:
(a) a flue in the heater;
(b) a hood means, connected at one end to the heater flue and at the other end open to the ambient air; and
(c) the cooling coil is disposed within the hood means to be cooled by ambient air flowing through the hood.

7. The system claimed in claim 6 wherein:
(a) the hood means is formed integrally with the heater and surrounds the cooling coil therein; and
(b) at least one passage means is formed in the hood means through which the ambient air will be drawn to pass in indirect heat exchange relationship with the cooling coil before entering the heater flue.

8. The combination claimed in claim 5 wherein a check valve is disposed in the cooling coil means to prevent water therein from entering the service outlet line.

9. The combination claimed in claim 4 including:
(a) heat controlled means to regulate the input of heat energy from the heat source responsive to the temperature of the water in the heater coil; and
(b) a temperature controlled valve operatively associated with the heater coil to regulate the flow of water from the heater coil in accordance with the temperature thereof, and in coaction with the heat control means, to reduce the flow rate of the water from the heater coil to maintain the lowest predetermined temperature required for the desired water purification when the demand on the system exceeds the system heat transfer capacity.

10. The combination claimed in claim 4 including a manually reset, automatic, temperature controlled, cut-off means operatively associated with the heater coil to cut off the flow of water from the heater coil when the temperature thereof drops below a predetermined value.

11. The combination claimed in claim 4 including:
(a) a heat exchanger having a first inlet connected to the heater coil to receive hot purified water therefrom;
(b) a second inlet in the heat exchanger to receive unpurified water to be passed in indirect heat exchange with the hot purified water therein; and
(c) an unpurified water outlet on the heat exchanger connected to the inlet of the heater coil to supply pre-heated unpurified water thereto.

12. The combination claimed in claim 11 including:
(a) at least one purified water outlet in the heat exchanger to deliver purified water passed from the heater coil; and
(b) each outlet positioned in relation to the extent of the indirect heat transfer required to deliver purified water at a substantially predetermined temperature.

13. The combination claimed in claim 12 wherein the heat exchanger is formed in an annular shape and disposed about the heater whereby the heat exchanger may be readily assembled and disassembled.

14. The combination claimed in claim 4 including:
(a) a pump disposed in operative association with the heater coil; and
(b) pressure responsive means connected to the pump to actuate the pump in accordance with the pressure differential between the unpurified water and the purified water in the system.

15. A service water purification system for purifying water comprising:
(a) a heater having a coil and a flue therein;
(b) the coil having an inlet and an outlet to pass water therethrough;
(c) a thermo-syphon circulation cooling coil connected in flow relationship with the heater coil to recirculate a portion of the hot purified water whereby a predetermined quantity of hot purified water will be continuously maintained at a substantially preset purification temperature;
(d) a heat exchanger having a first inlet therein, the inlet connected to the outlet of the heater coil to receive hot purified water from the heater coil;
(e) a second inlet in the heat exchanger to receive unpurified water, the unpurified water to pass in indirect heating exchange relationship with the hot purified water therein;
(f) a first outlet in the heat exchanger connected to the inlet of the heater coil to deliver pre-heated unpurified water to the heater coil;
(g) a second outlet in the heat exchanger to deliver cooled, purified water for service use; and
(h) at least one additional outlet in the heat exchanger to deliver purified water, each of the outlets positioned to determine the extent of indirect heat transfer between the water from the heater coil and the untreated water, to deliver service water at a substantially predetermined temperature.

References Cited by the Examiner

UNITED STATES PATENTS

| | | | |
|---|---|---|---|
| 24,094 | 5/1859 | Brooks | 122—441 X |
| 1,470,145 | 10/1923 | Caron et al. | 126—350 |
| 2,633,108 | 3/1953 | Sterick | 165—145 X |
| 2,654,583 | 10/1953 | Treanor | 165—108 X |
| 2,662,508 | 12/1953 | Gaylor | 165—66 X |
| 3,038,453 | 6/1962 | Armacost | 122—148 X |
| 3,139,067 | 6/1964 | Van Den Brock et al. | 165—39 X |
| 3,251,405 | 5/1965 | Haustrom | 165—66 |

MEYER PERLIN, *Primary Examiner.*

ROBERT A. O'LEARY, *Examiner.*

M. A. ANTONAKAS, *Assistant Examiner.*